April 22, 1958 H. DREYER ET AL 2,831,942
CONTACT DEVICE
Filed Feb. 10, 1953 6 Sheets-Sheet 1

INVENTORS:
Helmut DREYER and
Leonhard BURKHARD
Attorney

April 22, 1958
H. DREYER ET AL
2,831,942
CONTACT DEVICE
Filed Feb. 10, 1953
6 Sheets—Sheet 2
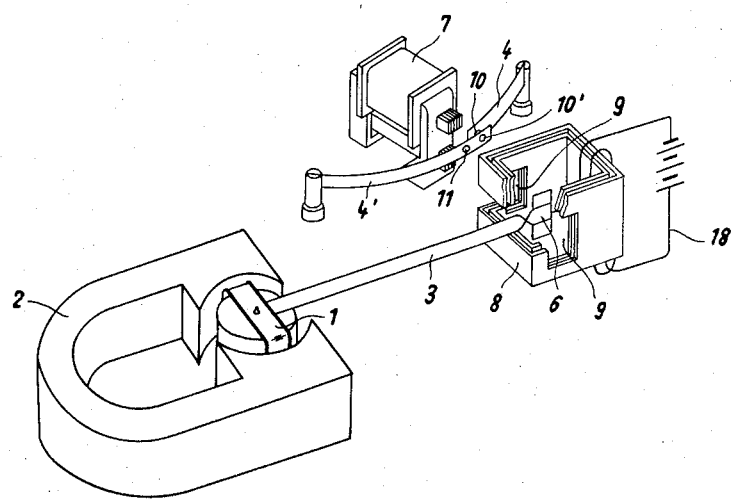
Fig. 5
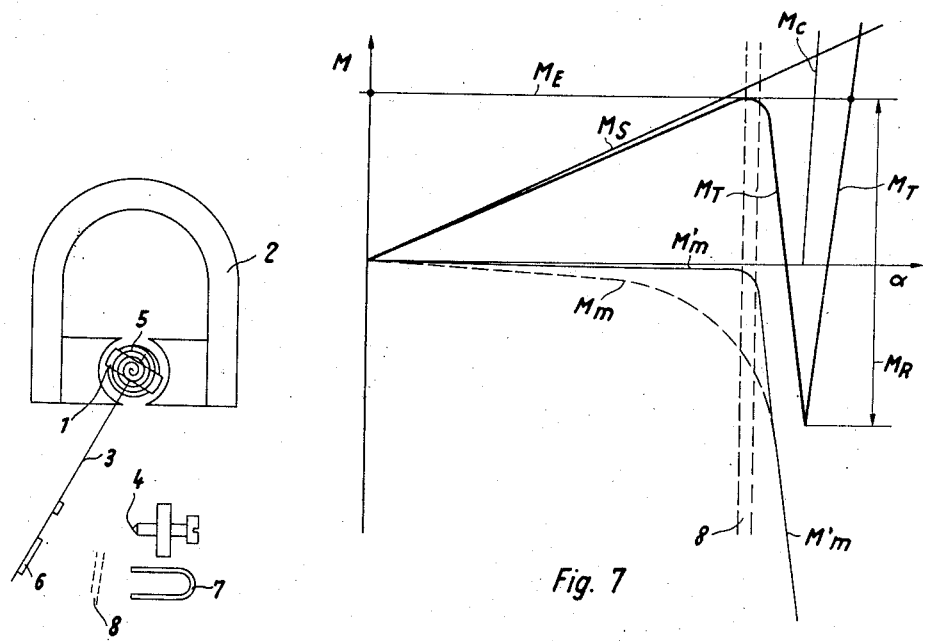
Fig. 6
Fig. 7
INVENTORS:
Helmut DREYER and
Leonhard BURKHARD
Attorney April 22, 1958  H. DREYER ET AL  2,831,942
CONTACT DEVICE
Filed Feb. 10, 1953  6 Sheets-Sheet 3
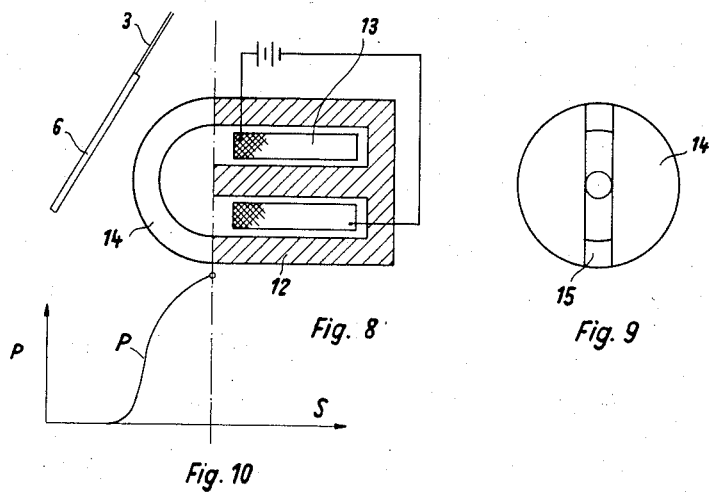
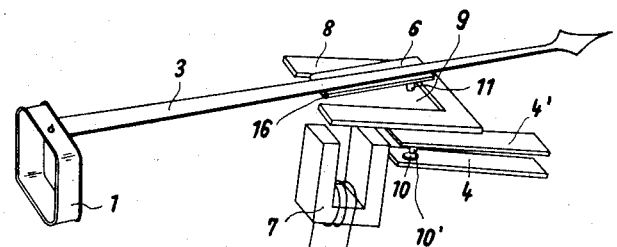
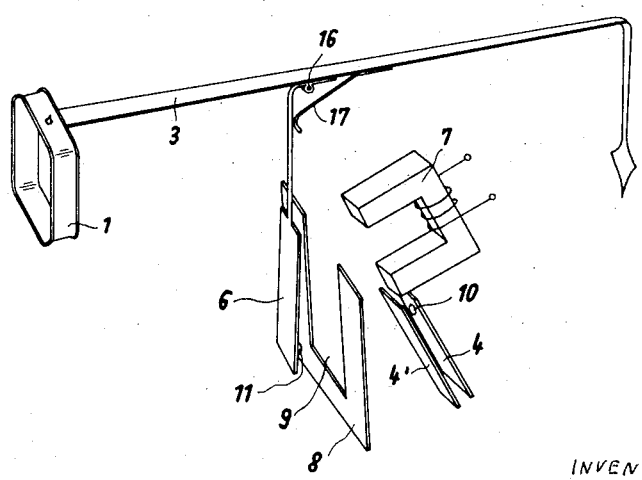
INVENTORS:
Helmut DREYER and
Leonhard BURKHARD
Attorney April 22, 1958   H. DREYER ET AL   2,831,942
CONTACT DEVICE Filed Feb. 10, 1953   6 Sheets-Sheet 4

INVENTORS:
Helmut DREYER and
Leonhard BURKHARD
Attorney

INVENTORS:
Helmut DREYER and
Leonhard BURKHARD

Attorney

United States Patent Office 2,831,942
Patented Apr. 22, 1958

2,831,942
CONTACT DEVICE

Helmut Dreyer, Erlangen, and Leonhard Burkhard, Nurnberg, Germany, assignors to P. Gossen & Co. G. m. b. H., Erlangen, Bavaria, Germany Application February 10, 1953, Serial No. 336,176

Claims priority, application Germany February 16, 1952

9 Claims. (Cl. 200—110)

This invention relates to a contact device.

It is an object of the invention to provide an arrangement for the magnetic intensification of contact forces in measuring apparatus, relays and the like.

A special object of the invention is to provide means for intensifying the contact pressure magnetically while avoiding the disadvantages normally involved in magnetic intensification.

Another object of the invention is to provide an arrangement ensuring a spontaneous contact making even in case of slowly increasing measured quantities controlling the measuring apparatus or relays.

A further object of the invention is to provide an arrangement in which changes in the excitation of the electromagnet have no deleterious effect upon the response of the relay or other contact apparatus.

Still another object of the invention is to increase the contact pressure in such a way that it becomes possible to provide a relative sliding of the contacts causing an automatic cleaning and damping effect so as to avoid rebounding of the contacts.

A still further object of the invention is to provide means by which sticking or adherence of the contacts is reliably prevented.

Other objects of the invention are such as may be attained by a utilization of the various combinations and principles hereinafter set forth in the varied relations to which they are obviously applicable by those skilled in the art.

The invention will be best understood and further objects will appear from a study of the following detailed description taken in connection with the accompanying drawings, with the understanding, however, that the invention is not confined to strict conformity therewith.

Figure 1:
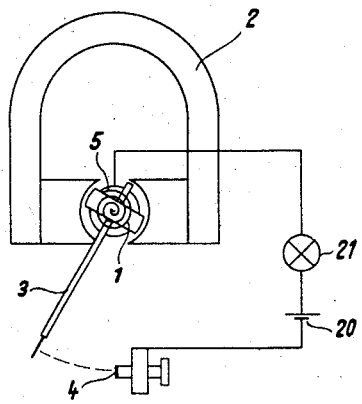
Figure 2:
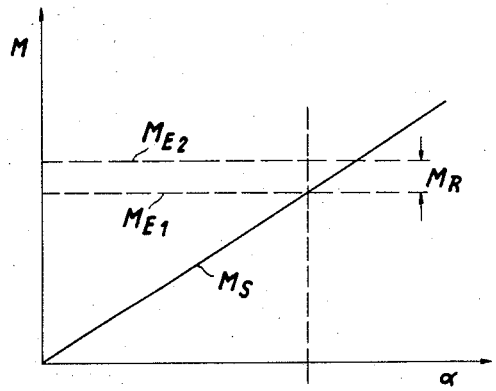
Figure 3:
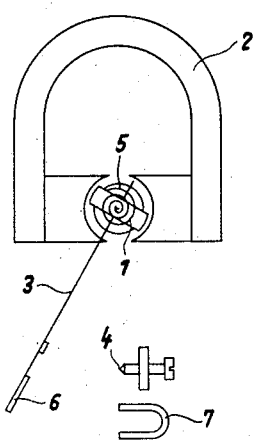
Figure 4:
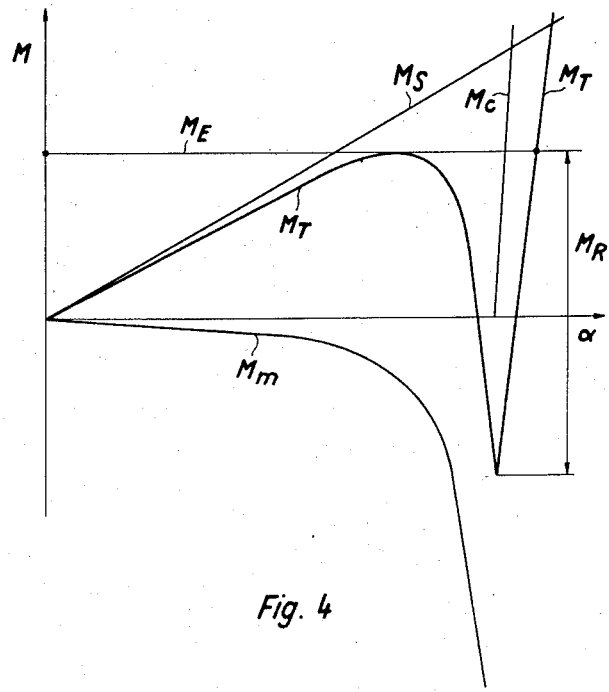
Figure 13:
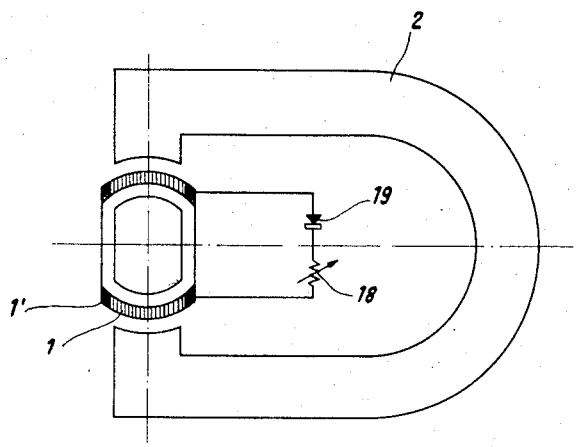
Figure 14:
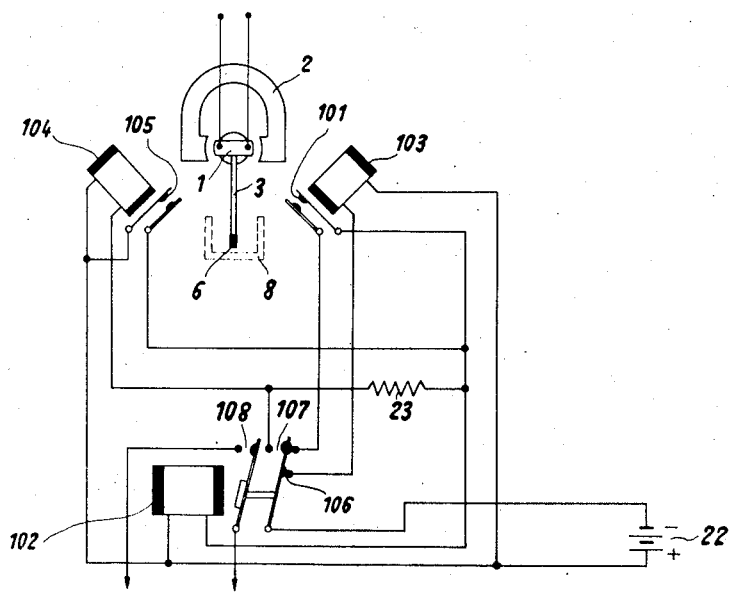
Figure 15:
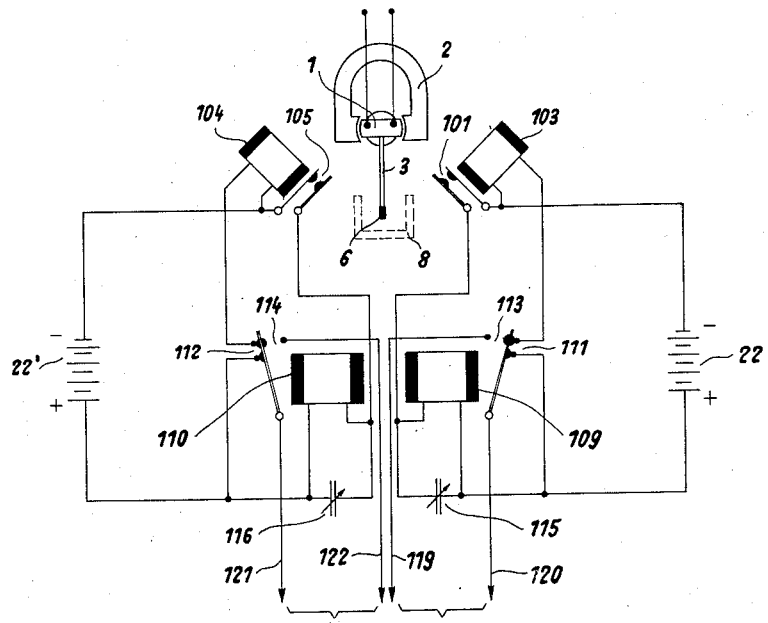
Figure 16:
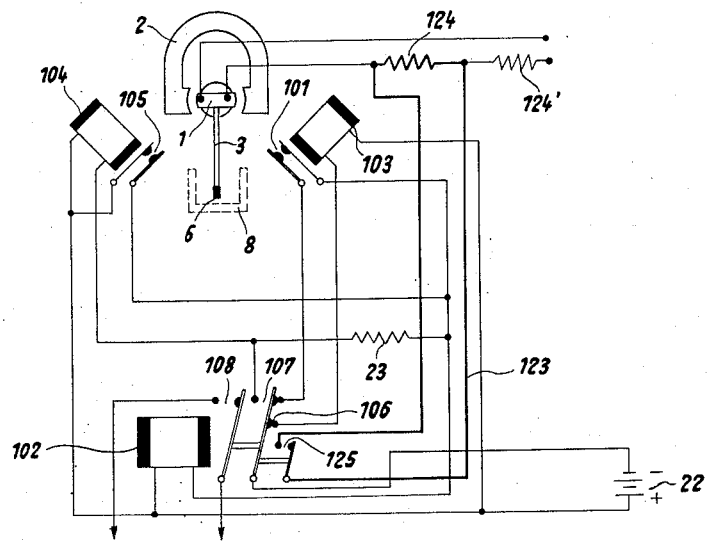
Figure 17:
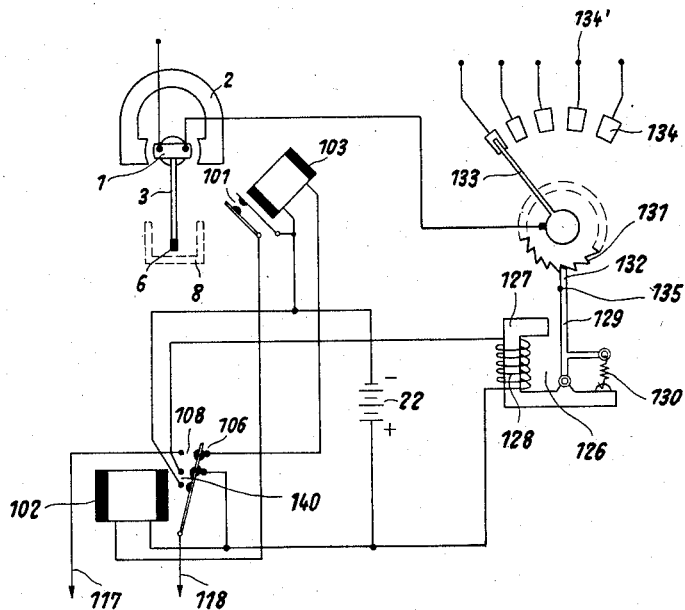
Figure 18:
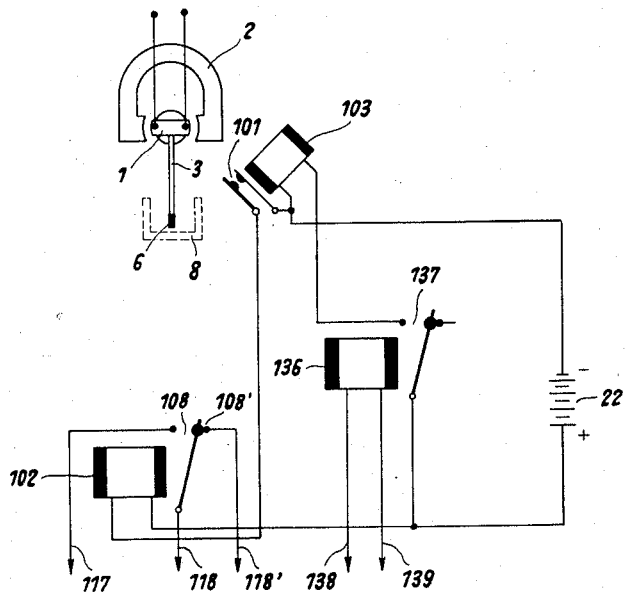

Fig. 1 is a diagrammatic view showing a conventional moving coil instrument with contact means, Fig. 2 is a diagram of the moments occurring therein, Fig. 3 is a view similar to Fig. 1, showing a conventional arrangement with intensification of contact pressure by a permanent magnet, Fig. 4 is a diagram showing the moments in this arrangement, Fig. 5 is a perspective view showing an arrangement having the invention applied thereto, Fig. 6 is a diagrammatic view of the arrangement as per Fig. 5, Fig. 7 is a diagram showing the moments occurring in this arrangement, Fig. 8 is a side view, partly in section, showing a modified form of the magnet, Fig. 9 is an end view thereof, Fig. 10 is a diagram showing the forces occurring in this case, Figs. 11 and 12 are diagrammatic side views of further modifications in which the forces of the auxiliary magnet act in other directions, Fig. 13 is a diagrammatic view showing a measuring system with different damping in opposite directions, Fig. 14 is a diagram of connection showing a relay system of the make-break type, Fig. 15 is a similar diagram but showing a relay system of the make-break-make-impulse type, Fig. 16 is a diagram showing a relay system for changing the response value, Fig. 17 is a diagram of a relay system adapted for changing over to different points of measurement, and Fig. 18 is a diagram of a relay system adapted for remote control.

Similar reference numerals denote similar parts in the different views.

In order that the invention and its various aspects may be better understood, it will be opportune to give at first a brief survey of the conventional contact systems.

Referring to the drawings in greater detail, and first to Figs. 1 and 2, it will be seen that the rotary part 1 of a moving coil instrument 2 has an arm 3 adapted to be moved against action of a spiral spring 5 towards a stationary contact 4 to close a circuit exemplified by a source of current 20 and a signal lamp 21, in dependence upon the current passed through the moving coil 1. In Fig. 2, the moments acting upon arm 3 are plotted against the angle of deflection of the instrument. The moment $M_S$ of the spring 5 is growing according to a straight line while the value of the moment exerted by the moving coil 1 and opposed to the moment $M_S$ is indicated by the dotted lines $M_{E1}$ and $M_{E2}$. It will be understood that the electric moment $M_E$ is a horizontal line in case of a homogeneous field, the distance of this line from the zero line depending upon the current. Of course, $M_{E1}$ and $M_{E2}$ should be plotted in a negative direction, but their negative value has been indicated for better comparison. The vertical dot and dash line indicates the angle $\alpha$ where arm 3 strikes against contact 4 for contact making. In case of the moment $M_{E1}$, this point will just be reached while in case of the moment $M_{E2}$ an excess moment will be produced causing a corresponding contact pressure ($M_R$). It will be understood that in this case the electrical contact in the moment where arm 3 just strikes against contact 4 is indefinite. Moreover, with slow alteration of the measured quantity the contact making moment becomes a creeping one, thus causing premature destruction of the contact surface.

In the arrangement as per Fig. 3 the arm 3 is provided with a magnetic armature 6 adapted to be attracted by a permanent magnet 7. The moments occurring in this case are shown in Fig. 4. Again, $M_E$ is the negative value of the electric $l$ moment while $M_S$ is the moment due to the return spring 5, $M_m$ the moment due to the magnetic attraction between 6 and 7, $M_C$ the moment due to the elastically yielding contact 4 and $M_T$ the total moment opposed to the electrical moment $M_E$. It should be noted, however, that the critical part of the curves $M_m$ and $M_c$ resulting in the right hand upward branch of curve $M_T$ has not been shown since the diagram would have become too large in this case, but it will be found out by extending these curves that the curve $M_T$ is obtained as a resultant curve. Again, the movable parts 1, 3, 6 of instrument 2 will take up the position defined by the point of intersection between the curves $M_E$ and $M_T$. With increasing measured quantity this point of intersection passes over into a point of tangential contact, as shown in Fig. 4. This is the critical point where the movable member 1, 3, 6 will tilt until it reaches the point where, owing to the resilient pressure exerted by the elastically mounted contact 4, the curve $M_T$ again intersects with the curve $M_E$. The moment $M_R$ causing the contact pressure in this case is independent of the actual moment $M_E$. This conventional arrangement, therefore, causes an increase of the contact pressure, but owing to the tilting characteristic of the curve $M_T$ the movable part 1, 3, 6 of the instrument 2 is prevented from coming off from contact 4 for returning to its initial position as the measured quantity is decreasing to a value below the quantity specified for contact making. Such automatic coming off can take place only when the electric moment of coil 1 is smaller than the lower minimum of $M_T$. Hence, in the conditions as indicated in Fig. 4 it would have to reach a considerable negative value which would be the higher, the more the contact force has been intensified by the magnet 7. The intensification of the contact pressure is limited by the fact that any increase of the intensity of the magnetic field of magnet 7 will result in an increase of its reach, whereby the accuracy of response of the relay to a specified minimum measured quantity is impaired.

The operating principle underlying the arrangement according to the present invention is exemplified in Fig. 5. A moving coil 1 is rotatably mounted in a field magnet 2 and carries an arm 3 at the extreme end of which is provided an armature 6 of soft magnetic material. A screening member 8 of rectangular form, consisting for instance, of soft sheet iron material, is formed with a slot 9 permitting passage of the arm 3 with armature 6 as indicated. The auxiliary magnet 7 in this case takes the form of an electromagnet and the contact consists of two springs 4, 4' adapted to be compressed by arm 3, 6 in such a way that the contact elements 10, 10' close the circuit to be operated by the relay arrangement. The spring 4' is provided with a pressure transmission element 11, preferably of a ceramic or other material of great hardness and very clean surface, such as corund, which may cooperate with a similar element (not shown) on the armature 6, so as to safely prevent adherence of the contact operating elements and to insulate the measuring instrument electrically from the circuit to be controlled. It will be seen that the contacts 10, 10' are arranged in such a manner as to carry out a sliding movement when making contact with each other. If desired, a second auxiliary magnet 7 may be arranged on the opposite side of the screening member 8.

Fig. 6 shows the arrangement of Fig. 5 in a diagrammatic representation and Fig. 7 the forces or moments occurring in this case. The curves are denoted in the same way as in Fig. 4 and the two dotted vertical lines indicate the position of the screening member 8. The moment due to magnet $M_m$ without the screen 8 is indicated by the dotted line curve $M_m$, while the actual curve resulting in view of the screening member 8 is indicated by the solid line curve $M_m$. It will be seen that the moment $M_m$ is very small on the left hand side of the screening but growing very rapidly on the right hand side thereof, whereby a total counter moment $M_T$ opposed to the moment $M_E$ of the moving coil is obtained which is almost identical with the moment due to the spring 5 on the left hand side of the screening 8, while falling rapidly to negative values, thus assisting the moment $M_E$, on the right hand side thereof. It will be understood that the disturbing influence of a variable excitation of the electric magnet 7 upon the movement of coil 1 is thus greatly reduced even if the field intensity of magnet 7 is considerably increased.

A similar effect can be obtained by providing an electromagnet whose field intensity is increasing very rapidly and steeply in the immediate vicinity of its poles while the stray field is a minimum. An auxiliary magnet of this type is shown in Figs. 8 and 9. The core 12 in this case takes the form of a so-called pot coil core which is excited by a coil 13 through a source of current 22, the magnetic flux being closed by a calotte-shaped extension 14 of the core which is formed with a slot 15 through which the armature 6 of arm 3 is permitted to enter into the field of the coil. The forces exerted by the magnet 12 upon the armature 6 in this case are indicated by the curve P plotted against the path S of the armature 6 towards the magnet 12. If desired, an additional screening may be provided in combination with this magnet. It will be understood that the effect caused by the magnet 12 is similar to that shown in Fig. 7.

By the arrangement according to the present invention it is possible to attain an amplification of the contact pressure by more than the $10^4$-fold. In this case, it is very important to safely prevent the tendency of adherence of the contacts and other elements engaging each other for making contact, which tendency will be the more disturbing, the smaller the return forces of the measuring apparatus are in relation to the contact force. Therefore, according to a further feature of the invention, a minimum force is provided to safely prevent such adherence. To this end, for instance, a pair of elastic contacts 4, 4' as per Fig. 5 are provided which are prestressed by the armature before making contact, in such a way that the force for opening the contacts is available as the armature 6 returns. It is thus possible to impart a considerable acceleration to the armature as the auxiliary magnet 7 is demagnetized, whereby the danger of adherence between the contact-making elements is minimized.

Even with an armature 6 of a very soft magnetic material a remanent magnetism is left in the armature which in case of highly sensitive measuring instruments may be disturbing. Such remanent magnetism is considerably reduced by the form of magnet shown in Figs. 8 and 10, since the armature in this case is polarized in opposite directions.

The screen 8 in Fig. 5 or the magnetic closure member 14 in Figs. 8 and 9 may consist of one or more layers of high magnetic permeance of similar or different magnetic properties, so as to obtain the desired increase of the field as the armature passes therethrough.

In Figs. 5, 6 and 8 the magnetic attraction of the auxiliary magnet 7 acts tangentially to the rotation of the moving member of the measuring instrument. It is also contemplated, within the purview of the present invention, to provide an arrangement in which the attractive force of the magnet acts in another direction in relation to the plane of rotation of the moving arm 3, for instance, in the way as shown in Figs. 11 or 13. In this case, the armature swings in a plane disposed at right angles to the plane of swinging of arm 3, by being hinged thereto, as indicated at 16 in Figs. 11 and 12. A weak return spring 17, Fig. 12, may be provided to ensure return of the armature into its initial position, or the armature itself may be sufficiently elastic to permit flexing and swinging thereof through the angle required for operating the contacts 4, 4'. It will be understood that in case of a tangential movement of the armature two auxiliary magnets (7, 12) can be provided in maximum, while in case of an armature swinging in an axial plane, referring to the axis of the instrument, as shown in Fig. 11, or of an armature swinging in a radial plane, as shown in Fig. 12, any desired number of auxiliary magnets may be provided to permit selective operation of the corresponding number of contacts 4, 4' in dependence upon the measured quantity.

The return acceleration imparted to the armature 6 by the springs 4, 4' in Fig. 5 produces a kinetic energy in the armature which may be high compared to the energy constituted by its counter moment, whereby the armature in the arrangement of Fig. 5 may be thrown into the reach of attraction of a second auxiliary magnet 7 possibly arranged on the opposite side and cause there an undesirable contact-closing which might cause hunting unless the damping of the measuring instrument is so high that the return acceleration energy is absorbed before the armature leaves the screened range. However, a high damping of the measuring instrument would cause a very slow motion in the screened range where only the small measuring forces are effective, whereby quick response would be rendered impossible. Therefore, according to a further feature of the invention the damping of the measuring instrument is made low in the screened range, but relatively high in the non-screened range of direct action of magnet 7. If desired, this damping may be different in the two directions, for instance, by providing on the movable member of the measuring instrument a damping coil whose circuit includes a conductor having different resistance in opposite directions of current: A measuring system of this kind is shown in Fig. 13. The moving system has a normal moving coil 1 and an additional damping winding 1' forming part of a circuit comprising a resistance 18 and a rectifier member 19 having different resistance values in opposite directions. The members 18 and 19 can be short-circuited in order to obtain uniform damping in both directions.

Both the screening member 7 or 14, the armature 6 and/or the core of the auxiliary magnet may be built up of one or more layers of similar or different magnetic materials, whereby various effects can be obtained. By combining a magnetically soft armature with a magnetically soft auxiliary magnet, it is possible to demagnetise the latter after the contact has been established, so as to attain a free adjustment of the moving coil system only under action of the measuring forces. The combination of a magnetically soft armature with a magnetically hard auxiliary magnet, e. g., a permanent magnet, renders it possible to save the source of current for the auxiliary magnet. This per se known arrangement is substantially improved by the screening as per Fig. 5 or by the closed magnetic circuit as per Fig. 8 in as much as higher contact forces are attainable than without this device. Normally it has the disadvantage that the armature has to be moved out of the field of the auxiliary magnet, e. g., by hand. However, in alarm plants, in which frequently a relay has to be returned to its inital position by hand, this may be very suitable.

It is also contemplated to combine a magnetically hard armature with a magnetically soft or magnetically hard auxiliary magnet. In this case, additional magnetic retaining forces will occur at the point where the armature 6 passes through the screen 7 or enters into the magnetic closure member 14. Such additional retaining forces may be utilized for attaining special characteristics of the total counter moment curve $M_T$. Also the screening can be used for attaining such effects either by making it magnetically hard in order to obtain a permanent effect, or by providing an additional winding for causing a permanent or temporary magnetization as indicated in Fig. 5 at 18 by dotted lines. A temporary magnetization of the screening as per Fig. 5 by an additional winding 18 will permit the measuring movement 2, 3, 6, to be temporarily retained in passing through the screening cage 8 for preventing the armature from being thrown into the field of the opposite auxiliary magnet, if any.

It is also contemplated to dimension the armature in such a way that it is saturated relatively soon after having entered the field of the auxiliary magnet. In this way the attractive forces and the acceleration of the armature can be limited even in case of a high surplus of the magnetising forces. This measure may be applied, for instance, in order to reduce the danger of rebounding of the contacts.

It will be understood that in the arrangement according to the present invention in view of the tilting character of the total counter moment curve a relay, once it is operated, will not automatically return to its initial position if the measured quantity decreases. To this end, the auxiliary magnet or magnets are de-energized or demagnetized with the aid of additional relays inserted in succession to the main relay. Some embodiments of relay circuits adapted for this purpose will be hereinafter described with reference to Figs. 14 to 18.

Referring at first to 14, it will be seen that the relay system in this case comprises a maximum auxiliary magnet 103 (i. e. a magnet for contact intensification in case of a maximum of the measured quantity) a minimum auxiliary magnet 104 (intended for intensification of the contact force in case of a minimum of the measured quantities) and a sequence relay 102 whose contacts are connected as shown. This system operates as follows: In case of response of the maximum primary switch 101 the magnet 102 of the sequence relay is energized, whereby the maximum auxiliary magnet 103 is de-energized through contacts 106, and simultaneously the minimum auxiliary magnet 104 is energized through contacts 107. Now the measuring system is subject to the mechanical moment of the return spring only on the maximum side and consequently is free to return as the measured value decreases. As it comes into the field of the auxiliary magnet 104 on the minimum side, the minimum primary switch 105 is operated, through the contacts 105 of which the sequence relay 102 can be de-energized by short-circuiting. As a result, the minimum auxiliary magnet 104 is de-energized, by opening contacts 107, and the maximum auxiliary magnet 103 is again energized through contacts 106. Thus any circuit to be controlled by the relay system when connected to the terminals 117 and 118 can be closed or opened through contacts 108 which may be designed for substantially higher output than the primary contacts 101 and 105. 23 is a resistance, and 22 is the energizing source of current.

In the diagram shown in Fig. 15, two sequence relays 109 and 110 are provided, relay 109 being operated by the maximum primary switch 101 and relay 110 being operated by the minimum primary switch 105 excited by sources of current 22, or 22', respectively. The sequence relays 109, 110 are connected in such a way that they will de-energize their associated auxiliary magnet 103, or 104, of the primary relays through contacts 111 or 112. Thus separate impulse contacts 113 and 114 will be closed, when reaching the maximum or minimum values. The duration of these impulses produced by the sequence relays 113, 114 can be varied by per se known retarding means, such as variable condensers, as indicated at 115 and 116. A relay system of this type will operate as a make-break-make impulse relay in relation to the controlled circuits to be connected at 119, 120, or 121, 122, respectively. The sequence of the impulses depends on the damping of the measuring system and grows in accordance with the amount by which the actually measured value is higher or lower than the specified value. Such relays in case of suitable connection of the measuring system can also be used as a directional relay.

It will thus be understood that the sequence relays primarily serve to ensure a proper control of the auxiliary magnet. In addition, the total interrupting or circuit closing capacity can be further increased thereby. It is also contemplated, however, according to the present invention to solve further problems with the aid of such relays. For instance, it is possible to alter the sensitivity of the measuring system, or to change the specified value, or to change over from one point of measurement to the next one in the course of a control procedure, to operate a step by step system, to obtain different and adjustable periods of contact and reponse, etc. It is also contemplated to have several measuring systems, acted upon by different measured values, act on one or several common sequence relays.

A relay system for altering the response value has been shown by way of example in Fig. 16. The arrangement is similar to Fig. 14, but in addition to the operations carried out by the system of Fig. 14, a circuit 123 is closed by response of the sequence relay 102 through contacts 125, whereby a resistance 124 of two series resistances 124, 124', in the measuring circuit is short-circuited with the result that the moving coil 1 is traversed by a current of higher intensity with the same measured value and, therefore, will return from the maximum position only when the measured quantity decreases to a correspondingly smaller value, whereby the characteristic of operation of the system is altered accordingly. By way of alternative, the contacts 125 may be arranged in such a way that they are opened by response of the sequence relay for causing the opposite result in regard to the insertion of resistance 124 and alteration of the characteristic of operation of the system, i. e., premature return of the system 1, 3, 6 from its maximum position to its minimum position.

Fig. 17 shows a system for switching over the measuring system 1 to a plurality of successive points of measurement, in a predetermined order. To this end, a step-by-step relay 126 comprises a main core 127 including an energizing winding 128, adapted to be energized through contacts 139 of relay 102, an armature 129 pivoted thereto for attraction to the main core 127 against action of a spring 130, a ratchet wheel 131 activated by a pawl 122 at the upper end of the armature 129, and a contact arm 133 adapted to make contact with any of a plurality of contacts 134 whose conductors 134' are connected to the various points of measurement (not shown). The pawl 132 is joined to arm 129 in per se known manner at 135. The relay system of Fig. 17 operates as follows: When the value measured at the point of measurement 134' reaches the response value, contacts 101 will close under action of the energized magnet 103, whereby magnet 102 is energized, closing the controlled circuit 117, 118 through contacts 108, opening the energizing circuit of magnet 103, through contacts 106, and closing the energizing contacts 140 of relay 128, whereby the ratchet wheel 131 is rotated through one step and arm 133 is changed over to contact 134''. The cycle of operation will now be repeated. Thus the measuring system 1 will be successively connected to each of the points of measurement 134', 134'' etc. in a step-by-step sequence, in dependence upon the operation of the maximum relay 101.

The relay system illustrated in Fig. 18 is adapted to provide a remote control of the contact system 101, 103, by operation of an additional relay 136 adapted to close and open a contact 137 for energizing and de-energizing the auxiliary magnet 103 whereby the whole system can be put into and out of operation in dependence upon the energizing of the relay 136 through leads 138, 139. Thus the electromagnet 103 may be energized periodically or in dependence upon the conditions of any other circuits, so as to operate the system only when the quantity to be measured is important or can be reliably measured. The control switch 108 in this case is fashioned as a change-over switch 108, 108', connecting the conductor 118 either to the conductor 117 or to the conductor 118'.

While the invention has been described in detail with respect to now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

We claim:

1. A contact system comprising contact means, an operating arm, means for moving said arm into at least one operating position for bringing the contact means into a contact-making position, under action of a control moment produced by a predetermined value of a measured quantity and against action of a counter moment composed of a mechanical moment and a magnetic moment weakening the mechanical moment, said moving means including a magnetic armature on said operating arm, an electromagnet adapted to attract said armature in a direction for moving the contact means into their contact making position, and recessed screening means shielding the armature, so that the magnetic moment acting upon the armature at its angle of deflection corresponding to said predetermined measured value is very small compared with the simultaneously acting mechanical moment, while on further deflection of the armature beyond this angle and through the recess in the screening means the magnetic moment within a very small angle of such further deflection becomes a multiple of the mechanical moment for causing engagement of the contacts with a sufficient pressure.

2. A contact system comprising contact means, an operating arm, means for moving said arm into at least one operating position for bringing the contact means into a contact-making position, under action of a control moment produced by a predetermined value of a measured quantity and against action of a counter moment composed of a mechanical moment and a magnetic moment weakening the mechanical moment, said moving means including a magnetic armature on said operating arm, an electromagnet adapted to attract said armature in a direction for moving the contact means into their contact making position, and recessed screening means shielding the armature, so that the magnetic moment acting upon the armature at its angle of deflection corresponding to the said predetermined measured value is very small compared with the simultaneously acting mechanical moment, while on further deflection of the armature beyond this angle the magnetic moment within a very small angle of such further deflection becomes a multiple of the mechanical moment for causing engagement of the contacts with a sufficient pressure, said recessed screening means being formed by an outer magnetically conductive portion of the magnet providing a return magnetic path therefor.

3. A contact system comprising contact means, an operating arm, means for moving said arm into at least one operating position for bringing the contact means into a contact-making position, under action of a control moment produced by a predetermined value of a measured quantity and against action of a counter moment composed of a mechanical moment and a magnetic moment weakening the mechanical moment, said moving means including a magnetic armature on said operating arm, an electromagnet adapted to attract said armature in a direction for moving the contact means into their contact making position, said electromagnet comprising a coil, a magnetic core traversing the coil, and a substantially cylindrical magnetic closure member forming a pot core and having an air gap for the passage of the armature, said closure member shielding the armature, so that the magnetic moment acting upon the armature at its angle of deflection corresponding to said predetermined measured value is very small compared with the simultaneously acting mechanical moment, while on further deflection of the armature beyond this angle and through said air gap the magnetic moment within a very small angle of such further deflection becomes a multiple of the mechanical moment causing engagement of the contacts with a sufficient pressure.

4. A contact system comprising contact means, an operating arm adapted to be moved into at least one operating position for moving the contact means into a contact-making position, under action of a control force produced by a measured value and against action of a counter balancing force, a magnetic armature on said operating arm, a magnet adapted to attract said armature in a direction for moving the contact means into their contact making position, recessed screening means shaped and arranged so as to permit passage of the armature through the recess and to confine the effective field of attraction of the magnet to the space between the recess in the screening means and the magnet, and means for energizing the screening means so as to shortly retain the armature as it passes through the recess.

5. A contact system comprising contact means, an operating arm, means for moving said arm into at least one operating position for bringing the contact means into a contact-making position, under action of a control moment produced by a predetermined measured value and against action of a counter moment composed of a mechanical moment and a magnetic moment weakening the mechanical moment, said moving means including a magnetic armature on said operating arm, an electromagnet adapted to attract said armature in a direction for moving the contact means into their contact making position, said electromagnet having a central core of one polarity and outer core portions of an opposite polarity in diametrically opposed positions with respect to the central core, and recessed screening means shielding the armature, so that the magnetic moment acting upon the armature at its angle of deflection corresponding to said predetermined measured value is very small compared with the simultaneously acting mechanical moment, while on further deflection of the armature beyond this angle and through said air gap the magnetic moment within a very small angle of such further deflection becomes a multiple of the mechanical moment causing engagement of the contacts with a sufficient pressure, said magnet and said armature being arranged in such a way that the armature is polarized both by the central and outer core portions for reducing its remanence.

6. A contact system comprising contact means, an operating arm, means for moving said arm into at least one operating position for bringing the contact means into a contact-making position, under action of a control moment produced by a predetermined measured value and against action of a counter moment composed of a mechanical moment and a magnetic moment weakening the mechanical moment, said moving means including a magnetic armature on said operating arm, a magnet adapted to attract said armature in a direction for moving the contact means into their contact making position, and recessed screening means shielding the armature, so that the magnetic moment acting upon the armature at its angle of deflection corresponding to the said predetermined measured value is very small compared with the simultaneously acting mechanical moment, while on further deflection of the armature beyond this angle and through the recess in the screening means the magnetic moment within a very small angle of such further deflection becomes a multiple of the mechanical moment for causing engagement of the contacts with a sufficient pressure, said contact means being constructed so that before reaching the contact making position an additional force has to be overcome which is sufficient to return the contacts to their original position as the control force is decreased to the value specified for opening the contact.

7. A contact system comprising contact means, an operating arm, means for moving said arm into at least one operating position for bringing the contact means into a contact-making position, under action of a control moment produced by a predetermined measured value and against action of a counter moment composed of a mechanical moment and a magnetic moment weakening the mechanical moment, said moving means including a magnetic armature on said operating arm, a magnet adapted to attract said armature in a direction for moving the contact means into their contact making position, and recessed screening means shielding the armature, so that the magnetic moment acting upon the armature at its angle of deflection corresponding to the said predetermined measured value is very small compared with the simultaneously acting mechanical moment, while on further deflection of the armature beyond this angle and through the recess in the screening means the magnetic moment within a very small angle of such further deflection becomes a multiple of the mechanical moment for causing engagement of the contacts with a sufficient pressure, said contact means being arranged in such a way that the contact surfaces are slidingly moved in relation to each other during the contact making movement of the armature.

8. A contact system comprising a moving coil rotatably mounted in a magnetic field, contact means, an operating arm, means for moving said arm into at least one operative position for bringing the contact means into a contact-making position, under action of a control moment produced by a predetermined measured value energizing said moving coil which is operatively connected to the operating arm and against action of a counter moment composed of a mechanical moment and a magnetic moment weakening the mechanical moment, said moving means including a magnetic armature on said operating arm, a magnet adapted to attract said armature in a direction for moving the contact means into their contact making position, recessed screening means shielding the armature, so that the magnetic moment acting upon the armature at its angle of deflection corresponding to the said predetermined measured value is very small compared with the simultaneously acting mechanical moment, while on further deflection of the armature beyond this angle and through the recess in the screening means the magnetic moment within a very small angle of such further deflection becomes a multiple of the mechanical moment for causing engagement of the contacts with a sufficient pressure, and short circuited winding means on said moving coil for damping the movement of the operating arm more intensively in the immediate vicinity of the magnet than at a greater distance therefrom.

9. A contact system comprising contact means, an operating arm, means for moving said arm into at least one operating position for bringing the contact means into a contact-making position, under action of a control moment produced by a predetermined measured value and against action of a counter-moment composed of a mechanical moment and a magnetic moment weakening the mechanical moment, said moving means including a magnetic armature on said operating arm, an electromagnet adapted to attract said armature in a direction for moving the contact means into their contact-making position, and a U-shaped magnetic screening member having a recess in each of its outer legs and arranged before the magnet in such a way that the armature has to pass successively the said recesses before being exposed to the attraction of the magnet, whereby the magnetic moment acting upon the armature at its angle of deflection corresponding to said predetermined measured value is very small compared with the simultaneously acting mechanical moment, while on further deflection of the operating arm beyond this angle the magnetic moment within a very small angle of such further deflection becomes a multiple of the mechanical moment for causing engagement of the contacts with a sufficient pressure.

References Cited in the file of this patent

UNITED STATES PATENTS

| | | | |
|---|---|---|---|
| 989,420 | Riechel | | Apr. 11, 1911 |
| 1,246,430 | Hopkins et al. | | Nov. 13, 1917 |
| 1,866,436 | Weston | | July 5, 1932 |
| 1,902,602 | Williams | | Mar. 21, 1933 |
| 1,920,764 | Nickle | | Aug. 1, 1933 |
| 2,014,385 | Lamb | | Sept. 17, 1935 |
| 2,062,915 | Lamb | | Dec. 1, 1936 |
| 2,066,514 | Beyer et al. | | Jan. 5, 1937 |
| 2,262,504 | Lamb | | Nov. 11, 1941 |
| 2,285,352 | Paulson | | June 2, 1942 |
| 2,464,886 | O'Reilly | | Mar. 22, 1949 |
| 2,614,188 | Williams et al. | | Oct. 14, 1952 |
| 2,666,111 | Savage | | Jan. 12, 1954 |

FOREIGN PATENTS

| | | | |
|---|---|---|---|
| 277,157 | Great Britain | | Sept. 15, 1927 |
| 566,048 | Germany | | Dec. 9, 1932 |